(12) United States Patent
Glasmann et al.

(10) Patent No.: US 7,506,050 B2
(45) Date of Patent: Mar. 17, 2009

(54) METHOD FOR CHECKING TRANSMISSION RESOURCES OF A PACKET-ORIENTED COMMUNICATION NETWORK WHEN THERE ARE TOPOLOGY CHANGES

(75) Inventors: Josef Glasmann, Pfaffenhofen (DE); Juergen Totzke, Poing (DE); Harold Müller, Gilching (DE); Marie-Mélisande Tromparent, München (DE)

(73) Assignee: Siemens Aktiengesellschaft, Munich (DE)

( * ) Notice: Subject to any disclaimer, the term of this patent is extended or adjusted under 35 U.S.C. 154(b) by 943 days.

(21) Appl. No.: 10/658,604

(22) Filed: Sep. 10, 2003

(65) Prior Publication Data

US 2004/0128397 A1    Jul. 1, 2004

(30) Foreign Application Priority Data

Sep. 10, 2002    (DE)    ................... 102 41 955

(51) Int. Cl.
*G06F 15/173* (2006.01)
(52) U.S. Cl. .............. 709/224; 709/223; 709/225; 709/226
(58) Field of Classification Search .......... 709/223–226
See application file for complete search history.

(56) References Cited

U.S. PATENT DOCUMENTS

| 5,289,462 | A | * | 2/1994 | Ahmadi et al. | 370/232 |
| 5,440,741 | A | * | 8/1995 | Morales et al. | 718/103 |
| 5,687,167 | A | * | 11/1997 | Bertin et al. | 370/254 |
| 5,781,537 | A | * | 7/1998 | Ramaswami et al. | 370/254 |
| 5,826,169 | A | * | 10/1998 | Natarajan | 455/13.1 |
| 5,881,050 | A | * | 3/1999 | Chevalier et al. | 370/230 |
| 6,292,466 | B1 | * | 9/2001 | Droz | 370/232 |
| 6,327,251 | B1 | * | 12/2001 | Bion | 370/255 |
| 6,487,170 | B1 | * | 11/2002 | Chen et al. | 370/231 |
| 6,493,317 | B1 | * | 12/2002 | Ma | 370/237 |
| 6,625,643 | B1 | * | 9/2003 | Colby et al. | 709/217 |
| 6,665,311 | B2 | * | 12/2003 | Kondylis et al. | 370/462 |
| 6,680,943 | B1 | * | 1/2004 | Gibson et al. | 370/392 |
| 6,690,678 | B1 | * | 2/2004 | Basso et al. | 370/468 |

(Continued)

FOREIGN PATENT DOCUMENTS

DE    10021502    11/2001

(Continued)

OTHER PUBLICATIONS

Valeroso et al. Performance Analysis of Resource Reservation Strategies in Broadband Networks. IEEE. 1998.*

(Continued)

*Primary Examiner*—Kenny S Lin
*Assistant Examiner*—Hieu T Hoang
(74) *Attorney, Agent, or Firm*—Staas & Halsey LLP

(57) ABSTRACT

To check transmission resources of a packet-oriented communication network on a topology change, a resource manager checks a reservation of the transmission resources based on the topology data relating to the topology of the communication network. Upon a topology change of the communication network, topology change information is transferred to the resource manager. The resource manager records new topology data which relates to the changed topology of the communication network. Based on the new topology data, the resource manager maps an existing reservation of the transmission resources to the changed topology of the communication network.

12 Claims, 2 Drawing Sheets

U.S. PATENT DOCUMENTS

| | | | | |
|---|---|---|---|---|
| 6,760,306 | B1* | 7/2004 | Pan et al. | 370/230 |
| 6,771,661 | B1* | 8/2004 | Chawla et al. | 370/468 |
| 6,799,255 | B1* | 9/2004 | Blumenau et al. | 711/152 |
| 6,823,381 | B1* | 11/2004 | Harper | 709/224 |
| 6,839,321 | B1* | 1/2005 | Chiruvolu | 370/230.1 |
| 6,885,644 | B1* | 4/2005 | Knop et al. | 370/254 |
| 7,024,483 | B2* | 4/2006 | Dinker et al. | 709/227 |
| 7,082,102 | B1* | 7/2006 | Wright | 370/229 |
| 7,092,356 | B2* | 8/2006 | Rabie et al. | 370/230 |
| 7,146,425 | B2* | 12/2006 | Oottamakorn et al. | 709/235 |
| 7,190,698 | B2* | 3/2007 | Svanberg et al. | 370/395.2 |
| 7,304,972 | B2* | 12/2007 | Cain et al. | 370/338 |
| 7,342,888 | B2* | 3/2008 | Sengodan | 370/236 |
| 2001/0033646 | A1* | 10/2001 | Porter et al. | 379/243 |
| 2002/0054149 | A1* | 5/2002 | Genise et al. | 345/810 |
| 2002/0075814 | A1* | 6/2002 | Desai et al. | 370/255 |
| 2002/0105965 | A1* | 8/2002 | Dravida et al. | 370/463 |
| 2003/0009551 | A1* | 1/2003 | Benfield et al. | 709/224 |
| 2003/0009552 | A1* | 1/2003 | Benfield et al. | 709/224 |
| 2003/0028641 | A1* | 2/2003 | Zhang et al. | 709/226 |
| 2003/0202512 | A1* | 10/2003 | Kennedy | 370/389 |
| 2004/0193705 | A1* | 9/2004 | To et al. | 709/223 |
| 2006/0099952 | A1* | 5/2006 | Prehofer | 455/440 |

FOREIGN PATENT DOCUMENTS

| | | |
|---|---|---|
| EP | 204 959 | 12/1986 |
| EP | 221 360 | 12/1992 |
| EP | 0 895 373 | 2/1999 |
| EP | 865 698 | 1/2001 |
| EP | 1 098 476 | 5/2001 |
| WO | 02/21797 | 3/2002 |

OTHER PUBLICATIONS

Prehofer et al. Scalable Resource Management Architecture for VoIP. In Proceedings of 5th International Conference on Protocols for Multimedia Systems, PROMS 2000, Cracow, October. http://www.prehofer.de/Papers/Proms-paper-2000.pdf.*

* cited by examiner

METHOD FOR CHECKING TRANSMISSION RESOURCES OF A PACKET-ORIENTED COMMUNICATION NETWORK WHEN THERE ARE TOPOLOGY CHANGES

CROSS REFERENCE TO RELATED APPLICATIONS

This application is based on and hereby claims priority to German Application No. 102 41 955.8 filed on Sep. 10, 2002, the contents of which are hereby incorporated by reference.

BACKGROUND OF THE INVENTION

In many packet-oriented communication networks, such as for example Local Area Networks or Wide Area Networks, quality of service is not guaranteed for communication between terminals of these communication networks if no additional measures are taken to ensure it. The level of service of a connection is frequently referred to as "Quality of Service" (QoS) and can include various transmission and connection resources such as the transmission bandwidth, the transmission speed, the transmission delay and/or a permitted error rate.

For contemporary communication systems that are frequently based on such packet-oriented communication networks, what are known as resource managers are provided to ensure a specified quality of service. These are each assigned to a communication network or a subnetwork and manage its relevant transmission resources. A resource manager enables prespecifiable transmission resources to be reserved for connections to be set up in each case. The resource manager only allows a connection if its resource requirement does not exceed the transmission resources available for the primary route of the connection. After successful reservation of transmission resources the resource manager monitors the permanent availability rate of the reserved transmission resources for a particular connection.

To be able to establish whether transmission resources requested for a connection are available on the primary route of this connection through the communication network the resource manager needs information about the topology of the communication network, i.e. about the networking structure of the network nodes and link lines and about their relevant transmission capacity. This type of topology information which specifies the topology of a communication network is frequently referred to as a topology image.

In practical operation of a communication network this topology can occasionally change. Such a topology change can for example be caused by an administrative configuration change or by a failure or a recovery of a network component. As a result can there can be a dynamic change of communication routes in the communication network on Layer 2 (e.g., through so-called spanning-tree procedures) and/or Layer 3 (e.g., by routing procedures such as RIP or OSPF) of the OSI reference model.

On of the problems with this type of topology change is that a reservation or assignment of transmission resources made in a resource manager is then no longer consistent with the changed topology of the communication network. This can lead to an overbooking of transmission resources and thereby to a deterioration in the Quality of Service (QoS) of existing real time connections and new connections to be established.

SUMMARY OF THE INVENTION

An object of this invention is to specify a method of checking transmission resources of a packet-oriented communication network which allows adaptive resource checking when the topology of the communication network changes.

To check transmission resources of a packet-oriented communication networks on topology changes a resource manager is provides which checks an reservation of the transmission resources in particular by connections, on the basis of the topology data relating to the topology of the communication network. A topology change in this document is also taken to mean changes to a network configuration or changes to operating conditions of the communication network. In accordance with the invention, as a result of a change to the topology of the communication network topology change information is sent to the resource manager. As a result the resource manager is caused to create new topology data relating to the changed topology of the communication network. On the basis of the new topology data created the resource manager maps an existing reservation of the transmission resources to the changed topology of the communication network.

A significant advantage of the invention lies in the fact that the resource manager can detect at an early stage and react to topology changes which as a rule result in a temporary inconsistency of a topology image present in the resource manager with the current topology of the communication network. By mapping the existing reservation of resources to the changed topology resource guarantees can be maintained for the connections which existed before the topology change, provided that can be combined with the new topology. In addition the transmission resources available after the change can be used particularly efficiently.

Advantageously the resource manager can temporarily change over to a static resource reservation mode as a result of receiving the topology change information. In the static resource reservation mode the transmission resources are reserved preferably in accordance with a method independent of the reservation of the transmission resources or of dynamic changes to the topology image or the topology data.

The static resource reservation mode is preferably left when there is once again a topology image in the resource manager that is consistent with the changed topology. The resource manager can assume that a consistent topology image exists if no further topology change information is received during the specified period. Accordingly receiving further topology change information during the static resource reservation mode can extend this mode by a specified period. The period can in this case be dependent of the extent of the topology change and/or of the size of the communication network.

Furthermore the resource manager can leave the static resource reservation mode after the new topology data has been recorded or after the existing resource reservation has been mapped to the changed topology.

In addition, resources reserved during the static resource reservation mode can be specifically marked by the resource manager. In this way these types of resource reservations can be detected later and handled in a specific way.

In accordance with an advantageous form of an embodiment of the invention the reservation of the transmission resources in static resource reservation mode can be based on the topology data available before the topology change. In this case connections can continue to be accepted or rejected in accordance with the original topology by the resource manager. Optionally terminal equipment involved in accepted connections can be caused by the resource manager to reduce their demand for resources to reduce the probability of overbooking.

In accordance with a further form of an embodiment of the invention, the resource manager can, in static resource reservation mode, reject resource requests and allow release of resources independently of the reservation of the transmission resources. This for example all connection requests can be rejected and all connection releases can be processed.

In addition a localization specification can be determined with the topology change information through which an area of the communication network affected by the topology change can be specified. As a result of knowing the area involved the resource manager can, in static resource reservation mode, reject only those resource requests that affect the area given by the localization specification and process all other resource requests on the basis of the topology that existed before the topology change.

The resource manager can further, within the context of mapping the existing resource reservation, check the changed topology for whether an overbooking of transmission resources is occurring. If it establishes an overbooking, it can then cause a connection which is contributing to this overbooking to be cleared down, assigned to another class of service, carried via another route or a coding with reduced use of resources to be used. In this way overbookings can be explicitly rectified by influencing one or just a few connections, with all other connections not experiencing any reduction in quality of service.

Furthermore—preferably to avoid an overbooking of transmission resources—within the context of the mapping of existing resource reservation to the changed topology more recent connections can be given preference over older connections and/or voice connection connections over other types of connections and/or connections with a user or service feature-dependent connection priority and/or connections with relatively low resource requirements and/or connections established outside static resource reservation mode over connections established during static resource reservation mode when transmission resources are being assigned. To this end the connections can be assigned transmission resources in the sequence of their relative preference.

In accordance with an advantageous development of the invention, topology relating to the topology of the communication network can be recorded by a topology manager and transferred to the resource manager. Accordingly the topology manager can, on detection of a topology change, transfer topology change information to the resource manager. The topology manager can be logically or physically separate from the resource manager or be integrated into the resource manager. A topology manager can also be responsible for a number of resource managers.

BRIEF DESCRIPTION OF THE DRAWINGS

These and other aspects and advantages of the present invention will become more apparent and more readily appreciated from the following description of exemplary embodiments, taken in conjunction with the accompanying drawings of which.

DETAILED DESCRIPTION OF THE PREFERRED EMBODIMENT

Figure 1:
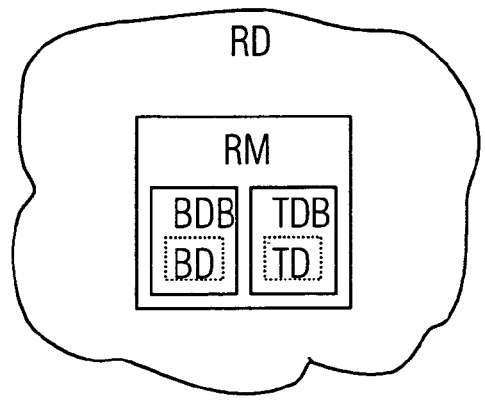
FIG. 1 is a block diagram of a resource manager within its resource manager domain.

Reference will now be made in detail to the preferred embodiments of the present invention, examples of which are illustrated in the accompanying drawings, wherein like reference numerals refer to like elements throughout.

In FIG. 1 a resource manager RM for reservation and management of transmission resources within a resource manager domain RD is shown schematically. The resource manager domain RD is a packet-oriented, preferably Internet protocol-based communication network, e.g., a LAN (Local Area Network) or WAN (Wide Area Network), or a subnetwork of the same for which the resource manager RM is responsible for allocating resources. The resource manager RM contains a topology database TDB with topology data TD stored within it. The topology data TD includes topology information relevant to both Layer 2 and also for Layer 3 of the OSI reference model and specifies the node structure, routing structure, connectivity and also the network configuration of the resource manager domains RD. The totality of the topology data TD specifies the entire topology of the resource manager domains RD and is accordingly designated as a topology image of the resource manager domains RD.

The resource manager RM further includes a reservation database BDB with reservation data BD specific to connections and/or class of service stored within it. The reservation data BD specify a current reservation in each case or reservation of transmission resources of the resource manager domain RD by communication connections. The reservation database BDB is accordingly updated each time a connection is set up or cleared down.

On the basis of the current resource reservations stored in the reservation database BDB as well as the topology image stored in the topology database TDB, the resource manager RM can process resource requests for connections to be set up. In this case the resource manager RM checks whether the current resource reservations of all sections of the connection along the relevant connection path allow the connection to be additionally set up without affecting the quality of service of other connections already carried via the connection sections.

Figure 2:
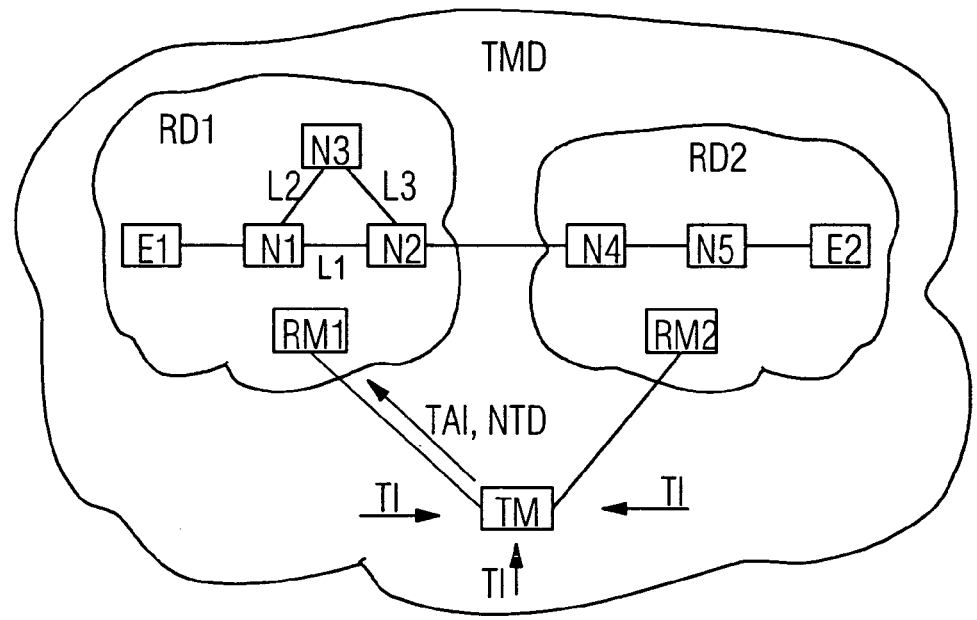
FIG. 2 is a block diagram of a packet-oriented communication system with a number of domains, each managed by a resource manager.

FIG. 2 shows schematically a packet-oriented communications system with a resource manager domain RDI managed by a resource manager RM1 and a resource manager domain RD2 managed by a resource manager RM2. A topology manager TM is responsible for detecting and monitoring the relevant topology of the resource manager domains RD1 and RD2. Die resource manager domains RD1 and RD2 belong to a topology manager domain TMD managed by topology manager TM.

In accordance with a variant of the exemplary embodiment, the functionality of the topology manager TM can also be integrated into a resource manager, here RM1 or RM2.

The topology manager domain TMD is realized in the present exemplary embodiment as an Internet Protocol-based communication network e.g., for voice, video and/or multimedia real time communication, preferably in accordance with ITU-T recommendation H.323 or in accordance with IETF Standard SIP (Session Initiation Protocol). The resource manager domains RD1 and RD2 subnetworks of this topology manager domain TMD.

The resource manager domain RD1 features a terminal E1 as well as network nodes N1, N2 and N3. Network node N1 is coupled here with network node N2 via a link line L1, with network node N3 via a link line L2 as well as with terminal E1. Network node N2 is further coupled via a link line L3 to network node N3.

The resource manager domain RD2 features a terminal E2 as well as network nodes N4 and N5. Network node N5 is in this case coupled to network node N4 as well as to terminal E2. In addition network node N4 is coupled across domains to network node N2.

Terminals E1 and E2 can for example be terminals for voice, video and/or multimedia real time communication, personal computers or communications applications or clients running on these computers.

In a communication network in accordance with ITU-T Recommendation H.323 terminal E1 or E2 can communicate via what is known as a gatekeeper as central connection controller with the responsible resource manager RM1 or RM2. By contrast, in an SIP-based communication network terminal E1 or E2 can communicate via what is known as an SIP Proxy with the responsible resource manager RM1 or RM2. In a communication network without central connection controller terminal E1 or E2 can communicate directly with the responsible resource manager RM1 or RM2.

For monitoring the topology of the topology manager domain TMD the topology manager TM records topology information TI on an ongoing basis which is transferred to it from topology manager domain TMD. In this way the topology manager TM creates a topology image of its topology manager domain TMD and keeps it updated.

The topology information TI is propagated in the topology manager domain TMD and recorded by the topology TM within the framework of a routing protocol, such as OSPF (Open Shortest Path First) for example, in the form of alarm data packets such as OSPF, SNMP (Simple Network Management Protocol) or configuration traps.

The topology manager TM determines topology data TD for the resource manager domain RM1 and RM2 to be stored in its respective topology database TDB in each case on the basis of its topology image. In this case each resource manager RM1 or RM2 only receives the topology data TD relevant for its resource manager domain RM1 or RM2, i.e., only the subview of the topology is transferred to each resource manager RM1 or RM2 which is relevant to it is transferred by the topology manager TM.

If a topology change arrives in the topology manager domain TD there is a temporary inconsistency between the actual topology of the topology manager domain TMD and the topology image of the topology manager TM or a topology image of the resource manager domain RM1 or RM2. This inconsistency phase is also frequently referred to as the instability phase. This type of topology change can be triggered for example by the failure of link lines or network nodes or by administrative configuration changes.

It is assumed for the present exemplary embodiment that the topology of the resource manager domain RD1 is changed by an interruption of the link line L1 so that network node N1 and N2 are now only coupled by network node N3 and link lines L2 and L3. The occurrence of this topology change as well as its restrictions on the resource manager domain RD1 can be detected by the topology manager TM at a relatively early stage on the basis of the topology information propagating in topology manager domain TMD. By recording further topology information TI topology manager TM can then successively harmonize its topology image so that it is back in synchronization with the actual changed topology.

Figure 3:
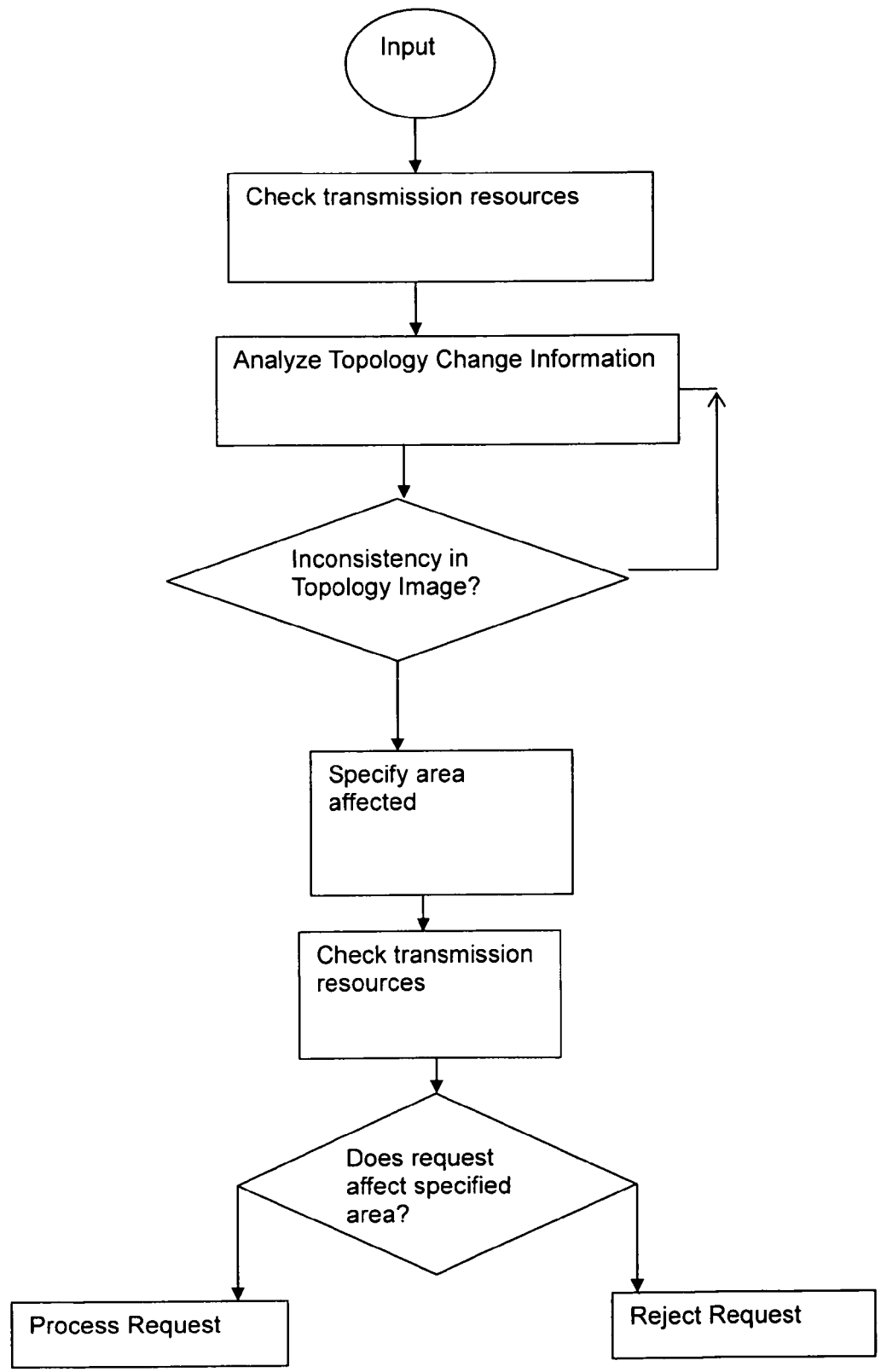
FIG. 3 illustrates an exemplary embodiment of the present invention.

FIG. 3 illustrates an exemplary embodiment of the present invention. As soon as the topology manager TM detects the arrival of the topology change it transfers in accordance with the invention topology change information TAI to the resource manager RM1 of the resource manager domain RD1 affected by the topology change. Resource manager RM1 detects on the basis of the transferred topology change information TAI that the topology image stored in its topology database TDB is not consistent with the actual topology of its resource manager domain RD1. As a result resource manager RM1 switches over during this inconsistency phase into a static resource reservation mode. The inconsistency phase ends when the topology image of the resource manager domain RM1 again matches the actual topology of its resource manager domain RD1.

In static resource reservation mode connection or resource requests can be processed in different ways by resource manager RM1:

In accordance with a first variant of the method all connection requests are rejected and processed as connection releases. In this way quality of service guarantees for existing connections, provided these are not directly affected by the topology change, can be maintained. Provided the inconsistency phase is relatively short a processing request can be delayed until the end of the inconsistency phase.

In accordance with a second variant of the method connection requests can be accepted or rejected in line with the original topology. Optionally when a connection is accepted, terminals involved, here E1 and E2, can be made to used coding (Codec) with reduced transmission resource requirements to reduce the probability of an overbooking of resources.

In accordance with a third, combined variant of the method, resource manager RM1 uses a localization specification transferred with the topology change information TAI, to detect the are of the resource manager domain RD1 affected by the topology change information. The localization specification can for example specify the number of hops in the area involved. The first variant of the method is then used in the affected area and the second variant of the method is used outside it.

The end of the inconsistency phase can be detected by the resource manager RM1 in that each time topology change information TAI is received a timer is started, provided further topology change information TAI arrives before the timer expires, the timer is restarted or extended and the inconsistency phase is taken as not ended. The period specified by the timer in each case can be specified depending on a type of topology change information TAI, such as for example failure of the link line, commissioning of the link line, route change or policing change, and/or depending on the network complexity or number of hops in the area of the topology change. Expiry of the timer is interpreted as the end of the inconsistency phase.

As soon as resource manager RM1 detects the end of the inconsistency phase, new topology data NTD specifying the changed topology is recorded by the resource manager RM1 which is transferred to it by topology manager TM. Preferably topology manager TM only transfers that topology data NTD that has changed compared to the original topology data TD stored in the topology database TDB. The new topology data NTD is stored in the topology database TDB of the resource manager domain RM1, whereby the topology database TDB is updated and the topology image of the resource manager domain RM1 is synchronized with the changed topology of the resource manager domain RD1.

Subsequently within the context of the changed topology available transmission resources are newly reserved by those transmission resources that would guarantee existing connections. In this way the reservation database BDB of resource manager domain RM1 is updated. To avoid overbooking in this case the procedure can be as follows:

- If connections of different types, e.g., video and voice connections are carried via a traffic class managed by resource manager RM1 the voice connection is reserved first
- More recent connections take preference over older connections.
- Connections that feature a user or service feature-dependent connection priority are given preference.
- Connections that use coding with low resource requirements are given preference.
- Connections that are set up outside the static resource reservation mode are given preference over connections set up during static resource reservation mode.
- Connections are made to use a higher compression coding.
- If overbooking still occurs, connections which contribute to the overbooking can be forcibly released.

The invention has been described in detail with particular reference to preferred embodiments thereof and examples, but it will be understood that variations and modifications can be effected within the spirit and scope of the invention.

The invention claimed is:

1. A method for checking, by a resource manager in an automatic process, transmission resources of a packet-oriented communication network upon a topology change, comprising:
    checking reservation of the transmission resources based on topology data relating to network topology of the packet-oriented communication network;
    analyzing topology change information generated as a result of the topology change of the network topology and received by the resource manager;
    temporarily switching to a static resource reservation mode, by the resource manager, upon receiving the topology change information indicating an inconsistency between a topology image stored in the resource manager and the network topology;
    transferring a localization specification with the topology change information to specify an area of the packet-oriented communication network affected by the topology change;
    rejecting, by the resource manager in the static resource reservation mode, resource requests that affect the area specified by the localization specification, regardless of the resource reservation of the transmission resources; and
    processing, by the resource manager in the static resource reservation mode, resource requests that do not affect the area specified by the localization specification based on the reservation of transmission resources present before the topology change.

2. A method according to claim 1, further comprising extending the static resource reservation mode in the resource manager by a specified period in response to receipt of additional topology change information during the static resource reservation mode.

3. A method according to claim 2, wherein the specified period is dependent on at least one of an extent of change in the topology and a size of the packet-oriented communication network.

4. The method of claim 3, further comprising when the inconsistency phase ends,
    recording, by the resource manager, new topology data relating to changed topology of the packet-oriented communication network; and
    mapping, by the resource manager, an existing reservation of the transmission resources to the changed topology, based on the new topology data.

5. A method according to claim 4, further comprising leaving the static resource reservation mode in the resource manager after at least one of said recording of the new topology data and said mapping of the existing resource reservation to the changed topology.

6. A method according to claim 5, further comprising specifically marking, by the resource manager, a resource reservation made during the static resource reservation mode.

7. A method according to claim 6, wherein reservation of the transmission resources in the static resource reservation mode is based on old topology data present before the topology change.

8. A method according to claim 6, further comprising:
    rejecting, by the resource manager in the static resource reservation mode, resource requests; and
    allowing, by the resource manager in the static resource reservation mode, resource releases independently of assignment of the transmission resources.

9. A method according to claim 4, wherein said mapping of the existing resource reservation to the changed topology includes the resource manager checking whether an overbooking of the transmission resources is occurring.

10. A method according to claim 9, further comprising upon detection of the overbooking by the resource manager triggers one of:
    clearing a connection contributing to the overbooking,
    assigning the connection to another class of service,
    carrying the connection via another route, and
    using coding with reduced resource requirements.

11. A method in accordance with claim 10, wherein said mapping of the existing reservation of resources to the changed topology includes at least one of:
    preferring more recent connections to older connections,
    preferring voice connections to connections of other connection types,
    preferring connections with at least one of a user feature-dependent priority and a service feature-dependent priority,
    preferring connections with relatively low resource requirements, and
    preferring connections set up outside the static resource reservation mode to connections set up during the static resource reservation mode during an assignment of transmission resources.

12. A method according to claim 11, further comprising:
    recording the topology data relating to the topology of the packet-oriented communication network by a topology manager; and
    transferring the topology data from the topology manager to the resource manager.

* * * * *